United States Patent [19]

Ross

[11] 4,294,405
[45] Oct. 13, 1981

[54] TRACTION BAG

[76] Inventor: Lawrence M. Ross, 5840 Highway V, Racine County, Caledonia, Wis. 53108

[21] Appl. No.: 126,335

[22] Filed: Mar. 3, 1980

[51] Int. Cl.$^3$ .......................................... E01B 23/00
[52] U.S. Cl. ...................................... 238/14; 5/417; 206/216; 229/56; 405/19; 428/76
[58] Field of Search ....................... 152/208; 238/14; 206/216; 229/55, 56; 405/19, 18; 5/448, 449, 455, 417; 428/76, 74, 168

[56] References Cited

U.S. PATENT DOCUMENTS 2,438,563  3/1948  Kollmeyer ........................... 238/14
3,561,219  2/1971  Nishizawa ............................ 405/19
3,874,177  4/1975  De Winter ............................ 405/19

FOREIGN PATENT DOCUMENTS 653658  12/1962  Canada ................................. 238/14
715939   8/1965  Canada ................................. 238/14

Primary Examiner—William A. Powell
Assistant Examiner—Thomas E. Bokan
Attorney, Agent, or Firm—Richard P. Ulrich

[57] ABSTRACT

A traction device for use with automobiles which comprises a wedge shaped bag filled with sand or a sand like material which when placed under the wheels of a car provides increased traction so that the car can be moved from a slippery place.

1 Claim, 1 Drawing Figure

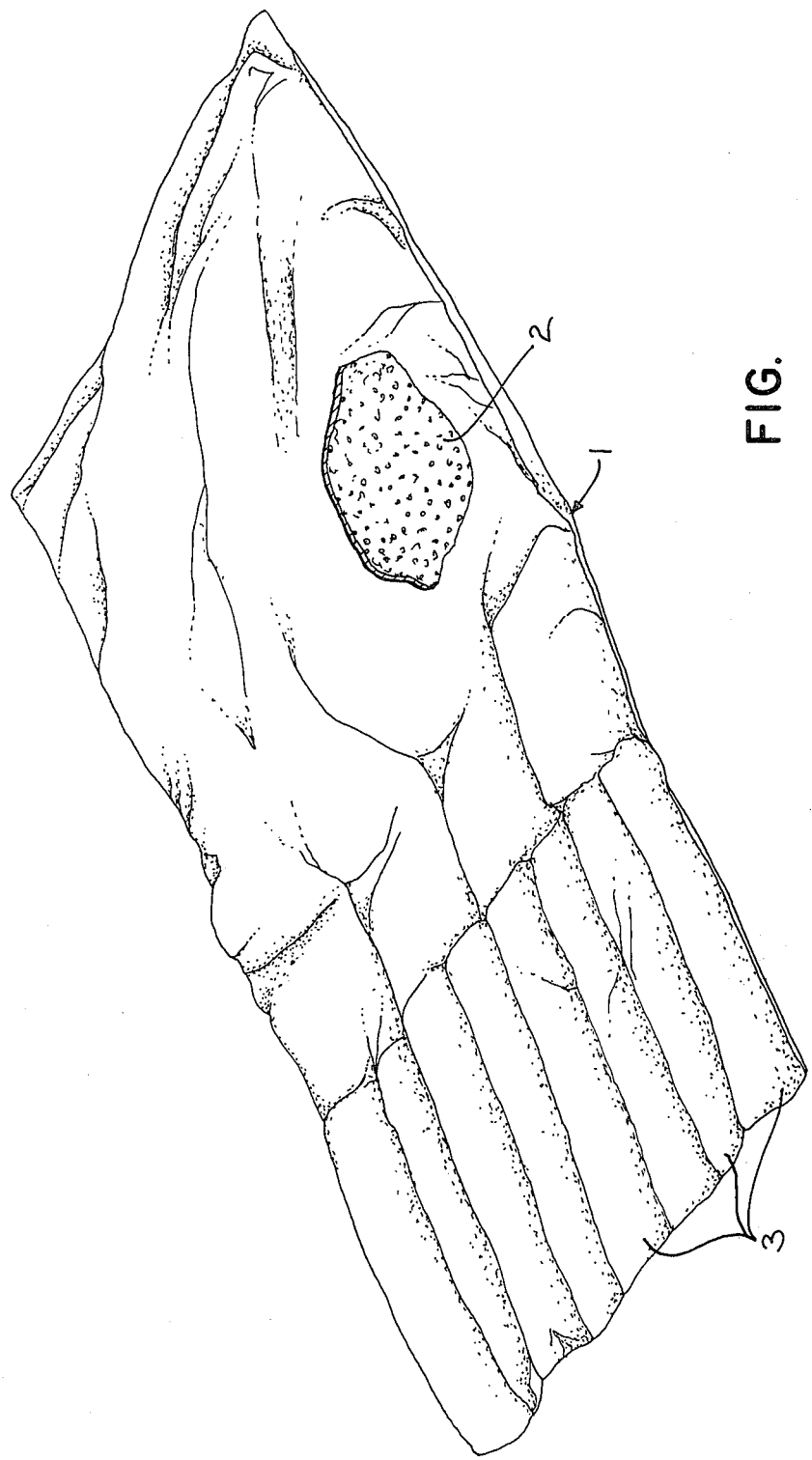

TRACTION BAG

BACKGROUND AND SUMMARY OF THE INVENTION

There are many devices which provide additional traction when placed under the wheels of a car stuck on a slippery surface. I am aware of mats, and chains, and steel tracks but nothing as simple as this device or as convenient to use.

This device comprises a bag of flexible material such as cloth having a plurality of lateral fingerlike compartments on one end. When the bag is filled with sand or other fine aggregate, the bag becomes wedge shaped. The material of which the bag is made is preferably flexible enough so that the bag will conform to the tread design of a tire and provide good traction.

To use the device, the end of the bag having the finger, like compartments is placed under the wheel of a car which is stuck on a slippery spot and the car driven onto the bag. As the car moves it rides up on the thick portion of the bag. The thick portion of the bag prevents it from being thrown out from under the wheel, a problem all to often encountered when removing a vehicle from snow or ice.

The bag will conform to any tread pattern and will not damage the roadway or the car in which it is stored.

DESCRIPTION OF THE DRAWING

The FIGURE is a three dimensional view of the wedge shaped bag.

DESCRIPTION OF THE PREFERRED EMBODIMENT

Referring to the figure, this device comprises bag 1, which is made of a flexible material such as cloth or plastic and filled with some kind of aggregate such as sand 2. Fingerlike compartments 3 are formed at one end of the bag. The result of this compartmentalization is to provide a bag of wedge shaped cross section.

When the thin edge of the wedge shaped bag is placed adjacent to a wheel which is slipping, the bag provides additional friction which allows the car to advance and thereby be removed from the slippery spot. The wedge shape of the bag prevents it from sliding under the wheel and being thrown out without moving the car.

What is claimed is:

1. A reusable traction device for automobile tires comprising a bag made of flexible material, filled with fine aggregate, said filled bag being sufficiently flexible so that it will tend to conform to a tread pattern when in use, the bag having a plurality of rows of fingerlike compartments on one end, the number of compartments per row decreasing with distance from the end of the bag so that the filled bag has a wedge shaped cross section, the wedge shape of the bag tending to prevent the bag from sliding under the tire without moving the automobile.

* * * * *